US005446840A

United States Patent [19]

Kiuchi et al.

[11] Patent Number: 5,446,840

[45] Date of Patent: Aug. 29, 1995

[54] SYSTEM AND METHODS FOR OPTIMIZED SCREEN WRITING

[75] Inventors: Raymond S. Kiuchi, Santa Cruz; Peter Johnson, Oakland; Randolph T. Solton, Berkeley, all of Calif.

[73] Assignee: Borland International, Inc., Scotts Valley, Calif.

[21] Appl. No.: 19,799

[22] Filed: Feb. 19, 1993

[51] Int. Cl.[6] .............................................. G06F 12/00

[52] U.S. Cl. ..................................... 395/164; 345/185

[58] Field of Search ............... 395/110, 143, 144, 147, 395/150, 155, 156, 157, 159, 162–166; 345/185, 192, 201, 99, 213; 348/910; 360/72.2

[56] References Cited

U.S. PATENT DOCUMENTS

| | | | |
|---|---|---|---|
| 4,139,869 | 2/1979 | Holt | 360/72.2 |
| 4,506,298 | 3/1985 | Mansell et al. | 348/910 |
| 4,688,167 | 8/1987 | Agarwal | 364/200 |
| 4,688,190 | 8/1987 | Bechtolsheim | 395/164 |
| 5,208,908 | 5/1993 | Harrison et al. | 395/164 |
| 5,245,328 | 9/1993 | Garrett | 345/99 |

*Primary Examiner*—Mark R. Powell
*Assistant Examiner*—Kee M. Tung
*Attorney, Agent, or Firm*—John A. Smart; Michael J. Ritter

[57] ABSTRACT

System and methods are provided whereby screen write operations, such as common in data processing, are performed at a frequency matched to a user's ability to perceive such information. Specifically, screen writing operations are minimized to only those which are really necessary for perception by the user. In all other instances (i.e., time periods when updating is not needed), image information is written to rapid-access memory. At periodic intervals, the system is interrupted so that a display image (maintained in video memory) is updated from the image stored in the rapid-access memory. A screen device (CRT) coupled to the video memory is updated accordingly (upon the next scan of video memory). By maintaining image data locally, the penalty incurred with frequent, large data transfers to video or display memory is avoided.

27 Claims, 7 Drawing Sheets

SYSTEM AND METHODS FOR OPTIMIZED SCREEN WRITING

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer systems and, more particularly, to systems and techniques for displaying information to a user of a computer system.

With the advent of the personal computer, the use of computer systems is becoming increasingly prevalent in everyday life. In the past, computers were often housed in highly restricted areas, with access limited to a few computer scientists and programmers. Today, however, computers can be seen on the desktops of most business professionals. Running software applications such as word processors and spreadsheets, for example, even the average business professional can realize substantial productivity gains. Besides the business environment, computers can also be found in wide use both at home and at school.

Also in contrast to the past, the average computer user of today is usually not a computer scientist. Instead, he or she will typically have little or no formal training in the computer sciences or even in the basic use of a personal computer. Nevertheless, these untrained workers often must be proficient in the use of computers in order to compete effectively in the job market. An applicant for a legal secretary position today, for example, is expected to be proficient in the use of wordprocessing software, such as WordPerfect™. As a result, there have been much interest in providing computers which are easier to use.

To increase ease of use, designers of computer systems have labored for decades to create architectures which are intuitive. Most of this effort has been centered around the user interface or UI—the means by which a user communicates (i.e., supplies input and receives output) with a computer. Not surprisingly, the quality of a user interface depends to an extent on the technology in the underlying hardware.

With increasingly widespread availability of powerful microprocessors, graphical user interfaces (GUIs, pronounced "gooeys") have become feasible. A GUI is a type of display format that enables a user to operate a computer by pointing to pictorial representations, such as "icons" (bitmaps) and "pull down" menus, displayed on a screen device. Choices are generally selected by the user with a keyboard and/or pointing device; the latter including such well-known devices as a mouse, track ball, digitizing tablet, light pen, or the like. Thus, the need for the user to memorize special commands has been lessened by the ability to operate a computer by selecting screen objects.

With well-known examples including Apple's Macintosh (Mac) interface, Microsoft's Windows, IBM's OS/2 Presentation Manager, Sun Microsystem's Open Look, and Open Software Foundation's Motif, the benefits of GUIs are tremendous. These interfaces simplify computer operation by providing users with graphical objects with which the user is already familiar. The popular "desktop metaphor" approach, for example, employs "folder" and "file cabinet" icons to simulate everyday objects. In addition to ease of use, GUIs offer consistency across applications and thus shorten a user's learning curve.

Despite all these advances, GUIs come with a rather pronounced disadvantage. In particular, GUIs are computing resource intensive, demanding both a high-resolution monitor and a fast microprocessor. The enormous demands on the hardware result from writing all those pixels to the screen, dot by dot, and redrawing (or refreshing) the screen image as the user scrolls up and down. For instance, medium-resolution Video Graphics Array (VGA) adapters display 307,200 pixels or points on the screen. One bit of information can only tell a dot to turn on or off. To encode color information, additional data bits are required (e.g., four bits for sixteen possible colors). Thus, a standard 640-by-480 pixel VGA screen operating with sixteen colors requires about 1,200,000 bits of information or about 150K.

And those requirements are modest in comparison to present-day Super VGA (SVGA) adapters, which, with its 800×600 pixel resolution, requires the painting of 480,000 pixels on the screen. To redraw that many individual pixels in anything approaching real time, as one would need when typing, scrolling, or drawing in application software, stretches the ability of even the fastest CPUs available for desktop computers. Thus, there has been much interest in accommodating the increased resource demands attendant with GUIs.

To date, most efforts devoted to improving performance of GUIs have focused on improving the hardware, namely the video adapters and display monitors. Of course the problem of inadequate video performance is by no means limited to GUIs. The demands for just about any graphic intensive application, whether GUI or non-GUI (e.g., AutoCAD for MS-DOS), strains the limits of present-day hardware. The extreme popularity of GUIs (especially Macintosh and Windows), however, has made the problem rather acute.

The problem of improving video performance is perhaps best described by briefly reviewing present day systems, and some of the solutions proposed to enhance performance. Most VGA and Super VGA controllers basically operate as "dumb" frame buffers, that is, they have no inherent capability to create complex images. Instead, these controllers are dependent upon the CPU of the computer to draw graphic images to screen by writing bytes into video memory (i.e., the dumb frame buffer). For drawing a line on screen, a standard controller card requires the CPU to calculate each pixel, including color information, which comprises the line. The performance in such a system is a function of how fast the CPU can read and write information to and from video memory. Because of the substantial amount of data that must be processed by the CPU and transferred across a notoriously slow system bus (typically operating at a fraction of the CPU clock rate), this approach yields poor results.

The newer generation of video boards or adapters, employing graphical "accelerators," such as the Weitek W5086, can take over management of many of the screen-redrawing processes, thereby shifting the load away from the CPU. These adapters include standard graphics functions (e.g., bitblt, line drawing, and area filling) resident on the controller itself. For drawing a line on screen, for instance, a graphics accelerator just requires the source point, destination point, line width, and color. Once given this information, the accelerator performs the rest, putting all the appropriate pixels on screen to create the correct line.

Related to accelerators are the (true) graphic coprocessors—on-board chips which are fully programmable. Coprocessors are typically based on one of the Texas Instruments 340X0 family of video coprocessors. Coprocessed boards rely on a chip that resembles the computer's CPU more than anything. Unlike accelerators, these chips do not rely on a fixed set of instructions; instead, they are programmable. Thus like accelerators, they achieve their speed increase by off-loading specific graphics operations from the host CPU.

Local bus video is another approach to improving graphics performance. Local bus video, in its simplest form, is video running at CPU speed. By taking the standard video chip set, graphics coprocessors or accelerator off the 8 to 10 megahertz I/O system bus and placing it on the motherboard (or dedicated slot) graphics data can be transferred not only in a larger quantity (32 bits instead of just 8 or 16 bits), but also at the same speed the motherboard processor is running (25, 33, or 50 megahertz, or beyond).

Despite all these advances in improving video performance, since these are hardware-based solutions, they entail hardware-based side effects, most notably incompatibilities and added expense. To achieve a competitive advantage in the marketplace, for example, many software developers write programs which directly access video hardware. As the available hardware proliferates, so does the potential for incompatibility with existing application software. Moreover, the addition of specialized circuitry increases the production cost for adapters, often on the order of hundreds of dollars. The hardware-based solutions have been, to date, far from ideal.

For the foreseeable future, there is an ongoing need for higher resolution, better performing video. Higher resolutions hold much appeal for these users. High resolution means more dots on the screen, and thus the ability to either display more information at one time, or to sharpen the image of that information (as compared with what was available with only a "course" VGA display). And with the increasing popularity of GUIs, users have increased their expectations of what is needed from a video adapter. What is needed is system and methods for improving graphics performance, particularly for systems employing GUIs, all without the need for dedicated hardware, with its attendant expense and potential incompatibilities. The present invention fulfills this and other needs.

SUMMARY OF THE INVENTION

The present invention recognizes that prior art screen writing (updating) methodology is wasteful. In particular, system resources in such systems are used for updating display information at a rate which simply cannot be visually perceived by a user.

According to the present invention, system and methods are provided whereby screen write operations are performed at a frequency matched to the user's ability to perceive such information. Since display image information need only be updated (written to display) about 25–30 times per second (or intervals of about 30 msec to 50 msec), computationally-expensive screen writing operations may be minimized to only those which are really necessary for perception by the user. In all other instances (i.e., time periods when updating is not needed), image information is written to rapid-access memory. By maintaining image data locally, the penalty incurred with frequent, large data transfers to display memory is avoided.

In an exemplary embodiment (designed for preemptive systems), a method for optimized screen writing proceeds as follows. First, a periodic timer is set (such as available from a system timer interrupt). Next, the system may proceed to perform one or more operations of interest. Display or screen output from such operations is written to rapid-access memory (not video or display memory). At periodic intervals (as established by the above timer interrupt), the system is interrupted so that the display image (maintained in video memory) is updated from the image stored in local memory. The screen device (CRT) of the video is updated accordingly (upon the next scan of video memory). In this fashion, image output from system operations is always directed to a rapid-access image memory (typically located as a portion of system memory) with periodic updates to video memory at a rate no greater than necessary for perception by the user.

DETAILED DESCRIPTION OF A PREFERRED EMBODIMENT

The following description will focus on the presently preferred embodiments of the present invention, which are embodied in applications operative in MS-DOS and Microsoft Windows environments. The present invention, however, is not limited to any particular environment or any particular application. Instead, those skilled in the art will find that the system and methods of the present invention may be advantageously applied to a variety of systems, including different platforms such as Macintosh, UNIX, NextStep, and the like. Moreover, the methods of the present invention will find application in other programs which display information. Therefore, the description of the exemplary embodiments which follows is for purposes of illustration and not limitation.

GENERAL SYSTEM

A. Hardware

Figure 1A:
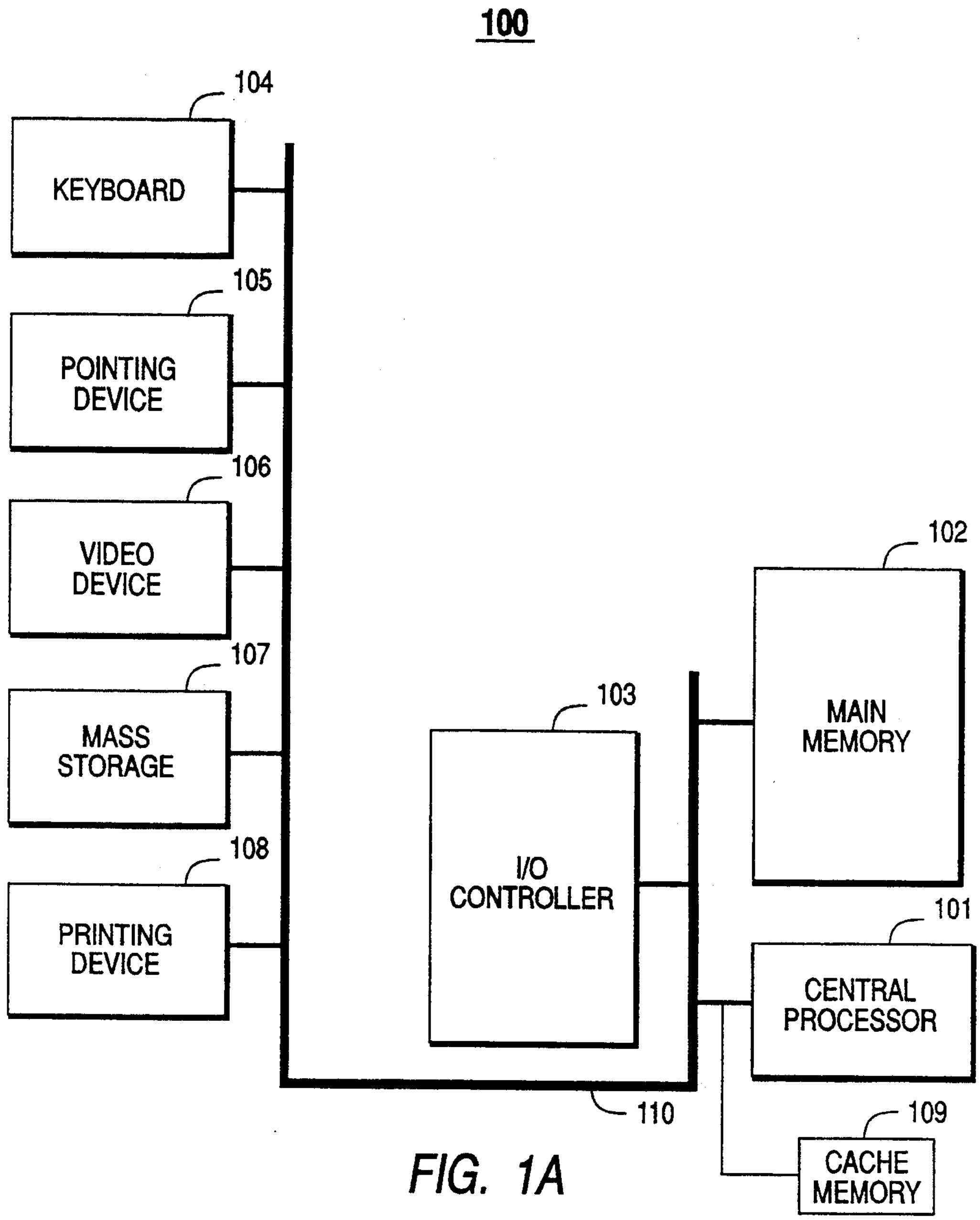
FIG. 1A is a block diagram of a system in which the present invention may be implemented.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PS/2-compatible personal computer, available from a variety of vendors (including IBM of Armonk, N.Y.).

B. System Software

Figure 1B:
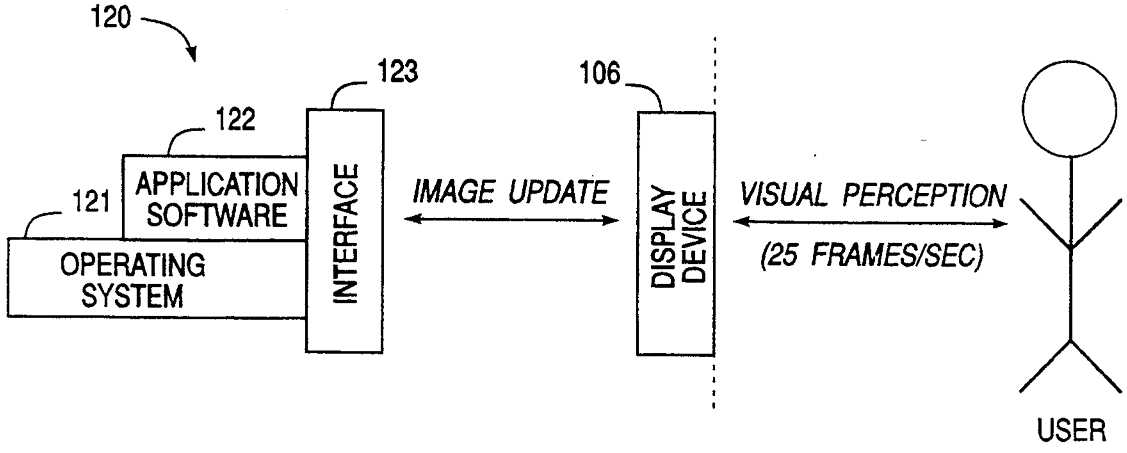
FIG. 1B is a block diagram illustrating the relationship between an end user, a display device, and system software.

Illustrated in FIG. 1B, a computer software system 120 is provided for programming the operation of the computer system 100. Software system 120, which is stored in system memory 102 and on disk memory 107, includes an kernel or operating system 121 and a shell or interface 123. One or more application programs, such as application software 122, may be "loaded" (i.e., transferred from storage 107 into memory 102) for execution by the system 100. Under the command of software 121 and/or application software 122, the system 100 receives user commands and data through user interface 123. Application software 122 can be any one of a variety of software applications, including word processing, database, spreadsheet, CAD applications, and the like. In an exemplary embodiment, operating system 121 is MS-DOS and interface 123 is Microsoft Windows, both of which are available from Microsoft Corporation of Redmond, Wash.

The interface 123 also serves to display results, whereupon the user may supply additional inputs or terminate the session. Specifically, the interface 123 is displayed by the display device 106, which is constantly updated with image information from the system. From the image on the display device, the user may perceive the results (i.e., information desired) for the task at hand.

Regardless of the speed with which the display device 106 is updated, however, the user may only assimilate information at a comparatively slow rate. From motion picture technology, for example, it is known that a frame rate of about 25 frames per second gives the visual perception of a continuous motion picture. As a result, those systems which display information at a rate which exceeds 25–30 frames per second are providing information faster than can be reasonably assimilated by the user. Systems which provide information at a rate below this threshold, on the other hand, lose the illusion of continuity afforded by this threshold frame rate.

C. Video subsystem

Figure 1C:
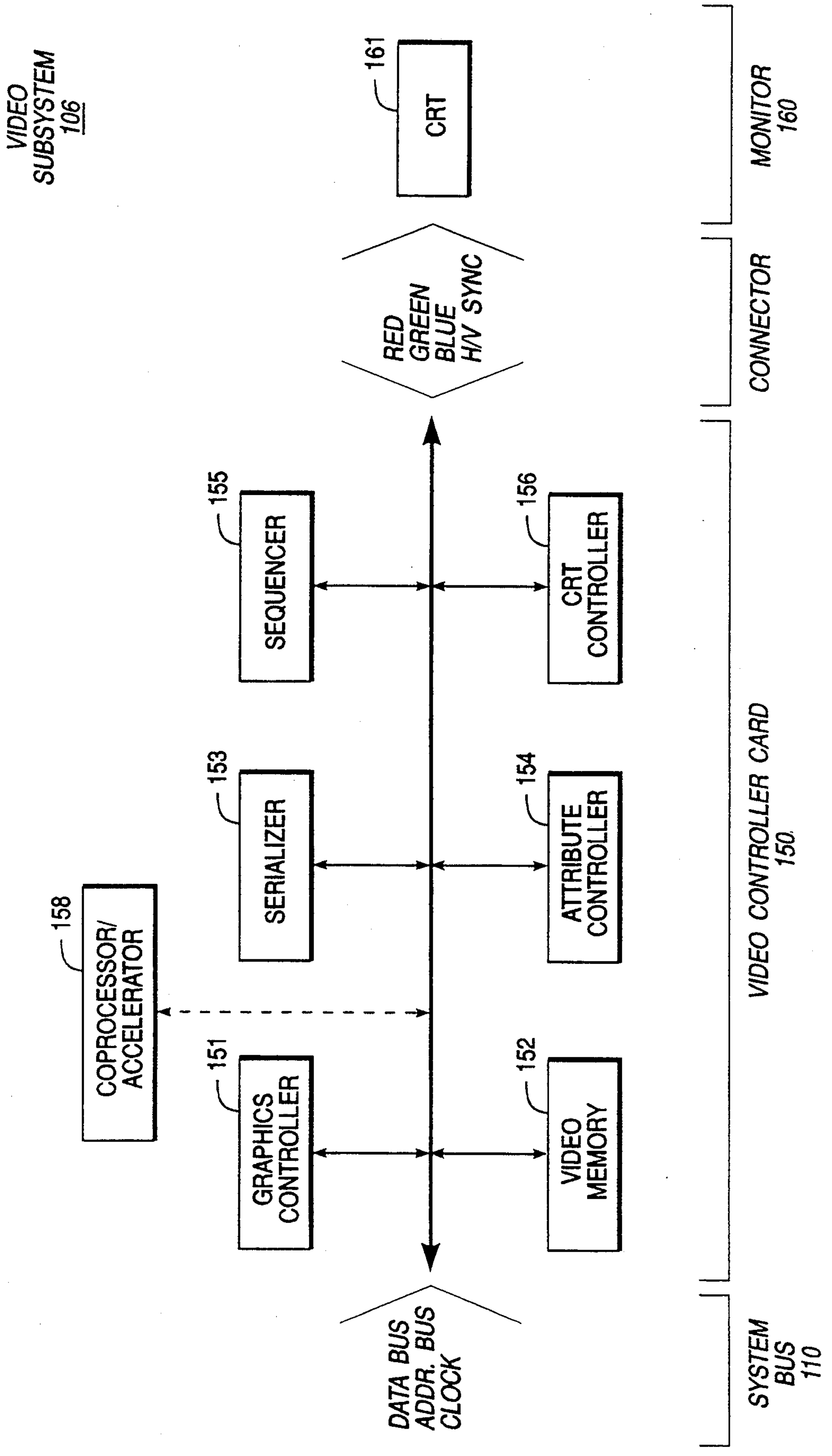
FIG. 1C is a block diagram illustrating a video subsystem (from the system of FIG. 1A).

Referring now to FIG. 1C, the video device or subsystem 106 of FIG. 1A will be described in greater detail. The video may be divided into two components: a video controller card 150 and a display monitor 160. In general, the video controller or adapter card receives address and data signals from the CPU 101. It, in turn, creates a video signal for driving the monitor 160.

Shown in further detail in FIG. 1C, an exemplary video controller card 150 comprises a graphics controller 151, a video memory 152, a serializer 153, an attribute controller 154, a sequencer 155, and a CRT controller 156. Optionally, a graphics coprocessor or accelerator 158 (as described above) may be added. The graphics controller 151, typically implemented as a VLSI integrated circuit, resides (conceptually) in the data path between the system processor 101 and the video or display memory 152. In its default state, the graphics controller is transparent (i.e., effectively allows direct access of the video memory 152 by the processor 101). In conjunction with a coprocessor or accelerator 158, the graphics controller 151 may be programmed to assist in drawing operations, thereby off-loading tasks that would otherwise be performed by the main processor.

Of particular interest to the present invention is the display or video memory 152 which serves as sort of an "electronic canvas" for creating images or bitmaps to be displayed on the monitor 160. Essentially, writing a single bit into the display memory 152 is equivalent to lighting one pixel on the monitor screen. Two common techniques for storing color information in video memory are the packed pixel method and the color plane method. With the former, all color information for a pixel is packed into one word of memory data. With the latter, more-common approach, the display memory is logically separated into independent "color planes" of memory, with each plane comprising a region of memory for representing a single color component (e.g., red, green, or blue). Each pixel of the display corresponds to a single bit position in each color plane.

As is known in the art, graphics adapters may be configured to operate in a "text mode". In text mode, the video memory is used to manipulate ASCII character codes rather than individual pixels. In a common scheme (e.g., IBM PCs), two bytes of display memory are used to define each character: the first byte (mapped at an even memory address) contains the ASCII character code and the second byte (mapped at an odd memory address) contains attribute information (e.g., color, underline, blinking, and the like). To complete the scheme, a translation table or character generator is used to convert an ASCII character code into a corresponding array of pixels on the screen. Since individual pixels are not addressable in text mode, display memory requirements are reduced and less burden is placed on the system processor. Since one is restricted to displaying a rather limited set of characters, however, the mode is unsuitable for creating complex graphics (such as needed for GUI operation).

The other components of controller 150 function as follows. The CRT controller 156 generates timing signals, such as syncing and blinking signals, to control the operation of the CRT display and display refresh timing. The data serializer reads the display information from the video memory 152, one or more bytes at a time, and converts it into a serial bit stream to be sent to the CRT display. The attribute controller 154 includes a color lookup table for translating color information from the display memory into color information for the CRT display. By programming the color lookup table for the adapter, for instance, one may specify a palette of colors for use on the display device. Finally, the sequencer controls the overall timing of the controller card, and may include logic for enabling and disabling color planes. A chip set suitable for constructing the controller card 150 is available from a variety of vendors, including Tseng, ATI, Chips and Technologies, Genoa, and Video Seven.

Coupled to the controller card 150, the monitor 160 converts video signals of the controller 150 into screen images. Typically, monitor 160 will be a Cathode Ray Tube (CRT) device 161, which generates an image in response to a beam of electrons striking a phosphorus coding on the back of its screen. The electron beam sweeps across the display screen from left to right in a series of horizontal lines. With conventional VGA and SVGA monitors, a complete frame (screen refresh) occurs on the order of about seventy times a second. Although the monitor's screen refresh operates in conjunction with updates to video memory, the reader should not confuse screen refresh (reading and displaying of video memory) with updates (writes) to video memory. Monitors suitable for use as a CRT 161 are available from a variety of vendors, including NEC, Sony, IBM, and Mitsubishi. Alternative display technologies, such as LCD and LED, are suitable for use as the monitor 160.

METHODS FOR OPTIMIZED SCREEN WRITING

A. Preemptive (interrupt-based) embodiment

Figure 2A:
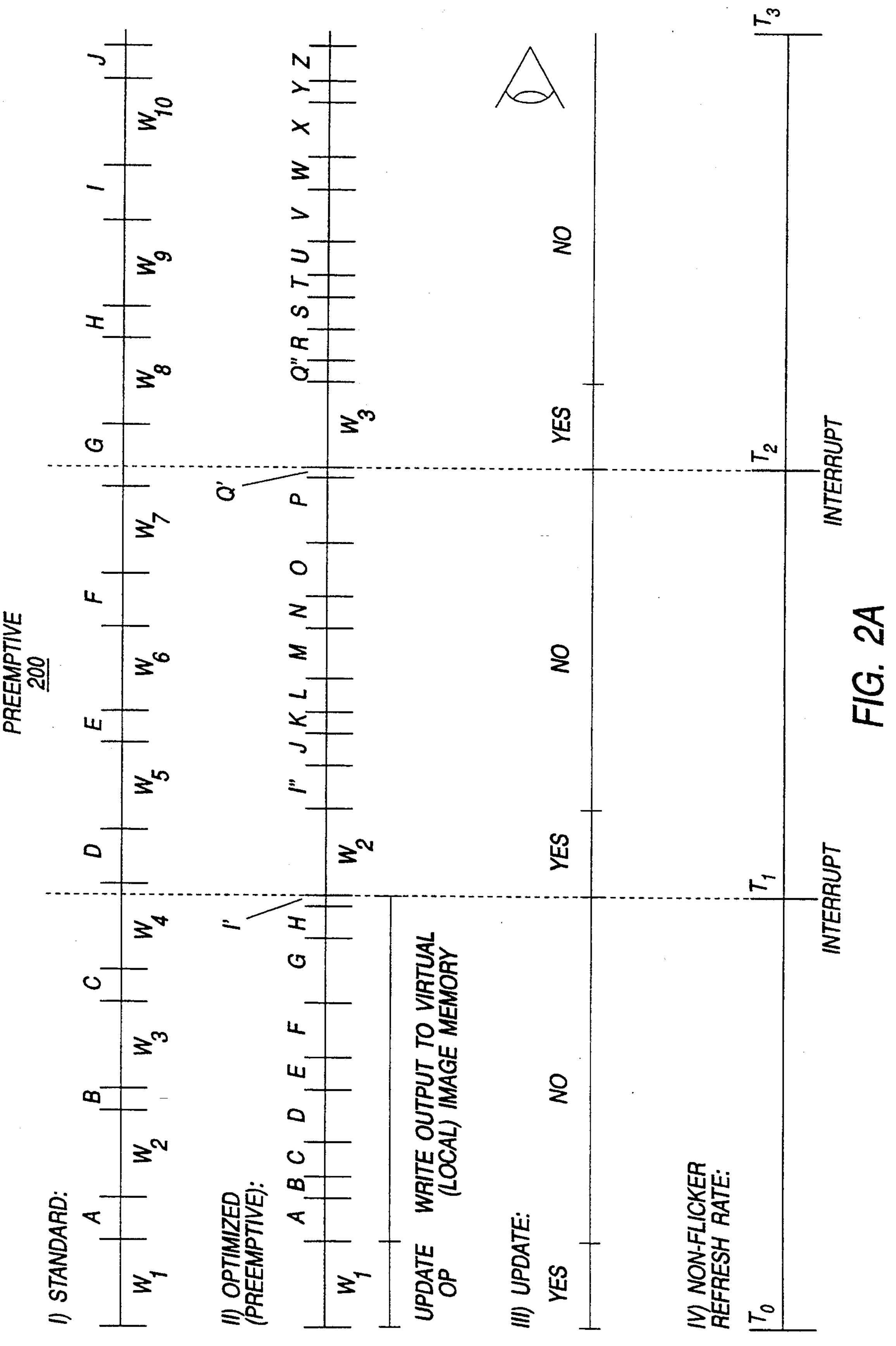
FIG. 2A is a timing diagram illustrating an optimized screen writing method of the present invention, operative in a preemptive (interrupt-based) system.
Figure 2B:
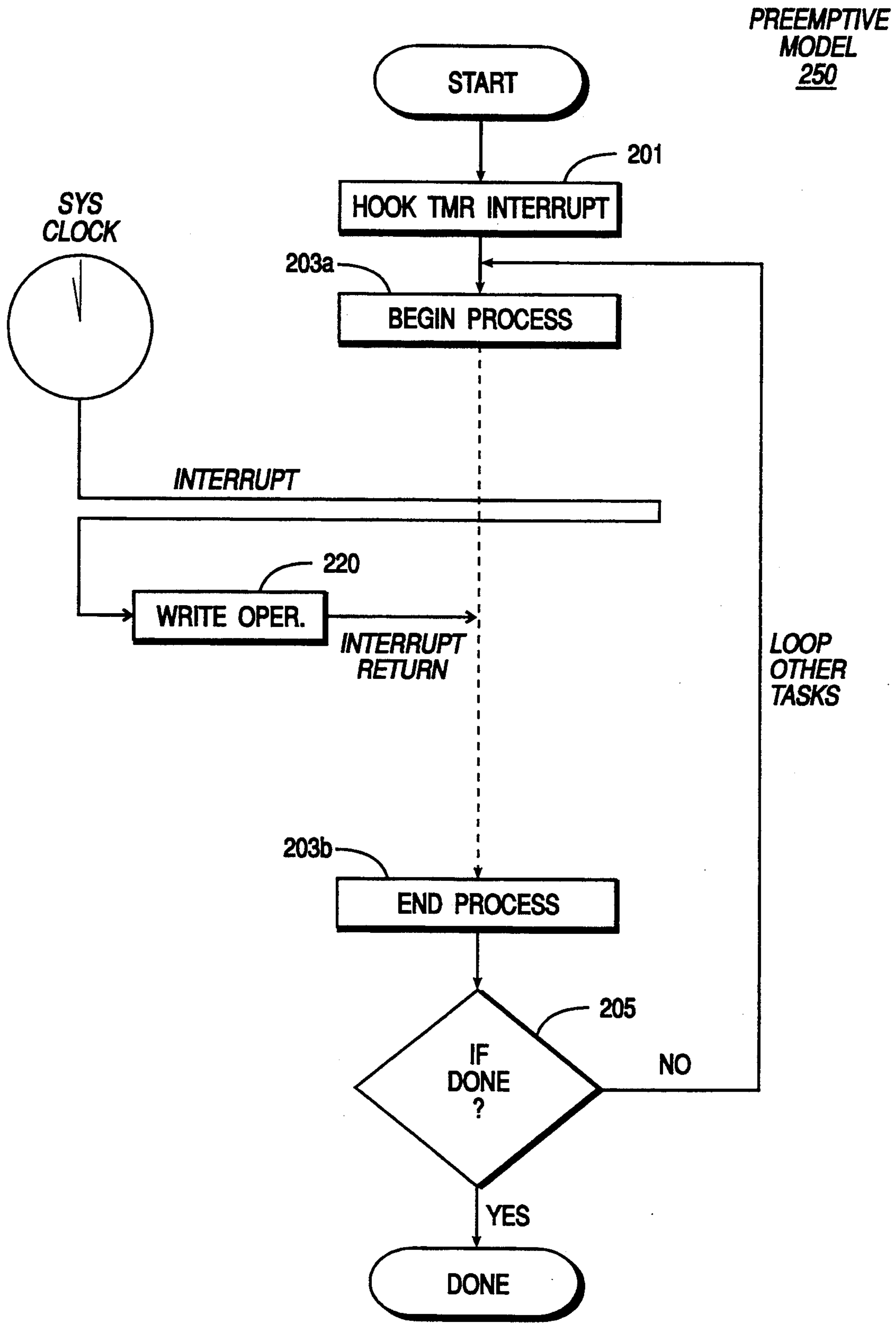
FIG. 2B is a flowchart illustrating the general operation of the optimized screen writing method (of FIG. 2A).
Figure 2C:
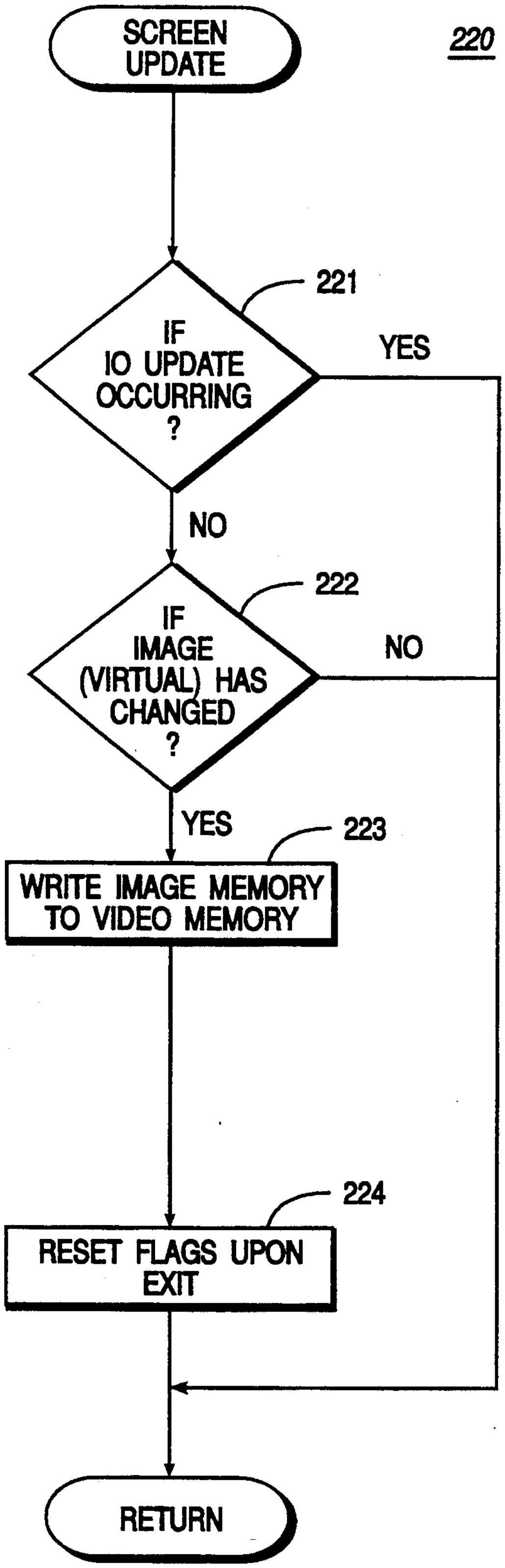
FIG. 2C is a flowchart illustrating the screen write or update step from the optimized screen writing method (of FIG. 2B).

Referring now to FIGS. 2A–C, a method of the present invention for optimized screen writing to the video 106 will be described. At the outset, it is helpful to review standard methodology for screen writing as shown by tracing I of FIG. 2A. From that foundation, the teachings of the present invention may be better understood.

Tracing I represents a series of processes or tasks executed by the processor 101 over a finite period of time. In operation, processor 101 receives a sequence of instructions (i.e., "machine instructions" encoded in the form of a sequence of bytes) from one or more logically defined areas (code segment(s)) of the memory 102. In typical operation, a specific sequence of instructions are defined to accomplish a given task. These are represented in tracing I by the letters A–J. These tasks, which are being performed by the processor 101, may be any one of the numerous applications which lends itself to modeling on a digital computer. Examples include such diverse applications as orbital simulation, word processing, a database "join" operation, and so forth. As each task is comprised of a plurality of machine instructions and each machine instruction, in turn, requires one or more system clock cycles within which to operate, each defined task requires an interval of time (time slice) within which to complete.

Interjected between those times which the processor is performing a particular task are screen writing or "paint" operations. Represented by $W_n$ time intervals, screen writing operations occupy a significant if not substantial portion of the central processor's time. As shown in tracing I, for instance, screen write operations may require a time slice of the processor's resources which is equal to or exceeds that required for other (non-writing) operations. For graphically intensive applications, such as Computer-aided Drafting (CAD) and Desktop Publishing (DTP), large segments of a processor's time will be occupied by writing image data to screen (accounting for the "resource intensive" reputation of such applications). In addition to moving the large amount of data required to support high resolution display, additional wait states may be added to the process while video memory (DRAM) itself is being refreshed.

As shown by tracings I and IV, not only is standard screen writing methodology resource intensive, but it is also wasteful. In particular, precious CPU cycles are being wasted updating video memory for information which simply cannot be visually perceivable by the user. In tracing I, for instance, three full screen update operations ($W_1$-$W_3$) are performed in a time period ($T_0$-$T_1$) where the user is able to only assimilate one frame of information. In other words, effort has been expended updating information on the screen at a rate which exceeds the ability of the user to perceive it.

With reference to tracing II, a preferred method of the present invention for optimized screen writing operative in the system 100 will now be described. Since image information need only be updated (written to display) about 25–30 times per second, computationally-expensive screen writing operations may be minimized to only those which are really necessary for perception by the user. As shown by tracing II, image information is written to screen only once per a predefined frame-rate time interval. In the time interval from $T_0$ to $T_3$, for instance, only three screen write operations are needed: $W_1$-$W_3$. Additional write operations are not necessary and are, in fact, wasteful of system resources.

As shown in the first time interval ($T_0$-$T_1$) of tracing II, a screen update operation is only performed once ($W_1$) during the interval. At all other times during the interval, the various system processes which may be executing (tasks A–I) direct their output to a "virtual image." The virtual image is a data structure compatible (i.e., directly transferable into) video memory 152. The image is maintained locally in "image memory" —an allocated section of memory 102. Data accesses to memory 102 execute substantially faster than ones to video memory 152. In the exemplary system 100, for instance, memory 102 includes a data path (bus) matching the system processor. For Intel 80386 and 80486-class computers, for example, full 32-bit memory access is available. Moreover, the bus for transferring data from the CPU to the system memory can be readily clocked at the same rate as the processor. Cache optimization may be added, as desired.

By maintaining the image data locally (in rapid-access memory), the penalty incurred with large data transfers to video memory is avoided. At a preselected time interval (one selected to match the desired frame rate), the locally-maintained image is written or strobed to video memory. In this fashion, computationally-expensive screen write operations are minimized to only those which are necessary for the end user.

Referring now to tracing III, the optimize screen writing method of the present invention (represented by tracing II) will be contrasted against standard methodology (tracing I). Tracing III summarizes the advantages of the present invention. For each time interval, there is a single period of time in which the screen image requires updating. This is illustrated by the "YES" intervals of the tracing. At all other times (i.e., the "NO" intervals), updating the screen image is unnecessary. Thus, any output activity occurring at that time is directed to the virtual image which is maintained in system memory with its 32-bit or wider data access operating at a rate substantially faster than that of the system bus.

As shown, the optimized writing method of FIG. 2A is preemptive or interrupt-based in nature. Specifically, at defined time intervals, system processes are interrupted so that the necessary minimum screen writes may be performed. An "interrupt" is a special type of instruction which causes the processor 101 to halt the execution of the current program, save the current state of the system on stack memory (maintained in memory 102), and jump to an appropriate interrupt-handling routine (specified by the number of the interrupt). After the interrupt routine has finished, it performs an "interrupt return", which causes the previously executing program to resume.

There are two basic types of interrupts, those generated by hardware and those caused by software. A hardware interrupt is typically generated by some system element outside the control of the executing program. Examples include a key press, a character arriving at a serial port, a tick of the system clock, and the like. A software interrupt, on the other hand, is generated on purpose by the running program. Intel 80X86 CPUs allow a program to execute a software interrupt via the INT machine instruction. The number that follows the instruction determines the number of the interrupt and serves as an index into an interrupt vector table whereby the appropriate interrupt handler may be invoked. The great majority of software interrupts employ INT 21h, which is the gateway to MS-DOS services, and INT 10h for ROM BIOS video services.

Of particular interest to the present invention are periodic hardware interrupts. AT-compatible computers, for instance, include a Motorola MC146818 real-time clock (RTC) chip (or functional equivalent) which provides the system with a real-time clock. The RTC chip includes the added capability of generating a periodic hardware interrupt at a program-specified frequency or time, which can be programmed to occur at frequencies ranging from 2 hertz to 8.192 kilohertz. By setting various status bits in the chip, for instance, the following periodic interrupt rates may be obtained:

TABLE 1

| RS Bits 3 2 1 0 | Periodic Rate | Ticks/Second |
|---|---|---|
| 0 0 0 0 | None | None |
| 0 0 0 1 | 3.90625 ms | 256 |
| 0 0 1 0 | 7.8125 ms | 128 |
| 0 0 1 1 | 122.070 μs | 8,192 |
| 0 1 0 0 | 244.141 μs | 4,096 |
| 0 1 0 1 | 488.281 μs | 2,048 |
| 0 1 1 0 | 976.562 μs | 1,024 (default) |
| 0 1 1 1 | 1.93125 ms | 512 |
| 1 0 0 0 | 3.90625 ms | 256 |
| 1 0 0 1 | 7.8125 ms | 128 |
| 1 0 1 0 | 15.625 ms | 64 |
| 1 0 1 1 | 31.25 ms | 32 |
| 1 1 0 0 | 62.50 ms | 16 |
| 1 1 0 1 | 125 ms | 8 |
| 1 1 1 0 | 250 ms | 4 |
| 1 1 1 1 | 500 ms | 2 |

To the timer interrupt, one may attach an interrupt service routine (ISR) for "servicing" (performing a desired task) in response to occurrence of the interrupt. In this fashion, a periodic interrupt may be generated at a rate selected to correspond with the desired frame rate. The use of system clocks for generating time-based interrupts is well documented in the technical, trade and patent literature. See e.g., Mischel, J., The AT Real-Time Clock, PC Techniques, June/July 1992, pp. 25–36, the disclosure of which is hereby incorporated by reference.

Referring now to FIG. 2B, the method of the present invention for optimized screen writing in a preemptive (interrupt-based) system is summarized by a flowchart 250. The steps are as follows. First, in step 201, a periodic timer is established, for example, by hooking into an available timer interrupt. The specific procedure for accomplishing this will vary from one hardware platform to another; those skilled in the art, however, will appreciate the functional equivalent of this step for their target system. One should select an interval sufficiently short in duration to achieve a frame rate at or above the user's perception threshold, typically on the order of about 25 to 30 frames/sec. For particular applications, such as text processing, slower rates (e.g., on the order of about 20 frames/sec) may still give acceptable results.

After the interrupt interval is established, the system may proceed to perform one or more operations of interest. Step 203 represents (conceptually) the performance of a particular task or process by the system. As shown, the process is interrupted at the preset interval, whereupon a write or screen update operation, step 220, is performed. The process can be any sequence of processor instructions. There is no requirement that the task itself be time-based (in contrast to real-time multimedia processes). The only requirement is that the process is one capable of being interrupted in response to occurrence of the interrupt which has been enabled in step 201. Of course to benefit from the method of the present invention, at least some output to a display device should be contemplated by at least one of processes to be performed.

Referring now to FIG. 2C, the screen update step is illustrated in further detail by a flowchart 220. It includes the following substeps. At step 221, the method determines if a screen I/O update operation is already occurring. Since the time interrupt occurs at defined intervals, it is preferable to include step 221 to prevent unnecessary reentry. Thus, if a screen I/O is already occurring (yes at step 221), then the submethod 220 aborts by returning. Otherwise (no at step 221), the method proceeds to step 222 to determine if the locally-maintained image (that is, one maintained in readily-accessible system memory, not in the slower-access video memory) has changed. If the image is unchanged (not "dirty"), then there is no point in updating the video memory with an identical image. In that instance (no at step 222), the method aborts by returning. The actual determination of whether an image is dirty may be done by a simple 1-bit flag associated with the image memory. Upon updating the image memory to video memory (below at step 223), the flag will be reset to zero. Upon occurrence of an output or write operation to the image memory, on the other hand, this "dirty bit" is set to true.

If the image has changed (yes at step 222), then the video memory requires updating at the specified time interval. Thus, at step 223, the image information maintained in the image memory is written to video memory. The CRT image is updated accordingly (upon the next scan or read of video memory). In this fashion, image output is always directed to a rapid-access image memory (portion of system memory 102) with periodic updating or strobing to video memory at a target rate no greater than that necessary for perception by the user. Upon completion of step 223, the submethod 220 resets the I/O update and dirty image flags at step 224 and then returns (back to step 203 of method 200).

In an exemplary embodiment, a suitable screen-update routine may be constructed as follows (in C language):

```
int IoUpdateScreen()
{
    int row;
    int col;
    int16 *displayMemory;
    int16 *imageMemory;
    int16 charAttribute;
    Bool mouseHidden;
    if (ioImageUpdated && !ioUpdateOccurring &&
        PRG_SCREEN_UPDATE && prgImageExists) {
        ioUpdateOccurring = TRUE;
        mouseHidden = mouseStatus & MOUSE_HIDDEN;
        if (!mouseHidden) {
          MOUSE_HIDE_CURSOR_IF_MOUSE;
        }
        displayMemory = (int16 *) ioScreenStart;
        imageMemory = (int16 *) ioScreenImage;
        if (!SET_ON_OFF(Retrace)       (!ioInt10 &&
        !ioColor)) { /* A3276 */
            /* write directly to display card memory
            from image buffer*/
            memcpy(displayMemory,imageMemory,
            ioAbsScreenLength *
ioAbsScreenWidth
          * sizeof(int16));
        }
        else {
          for (row = 0; row < ioAbsScreenLength;
          row++) {
            for(col = 0; col < ioAbsScreenWidth;
            col+=1) {
              charAttribute = *imageMemory;
              if (ioInt10) {
                IoSetcursor(row,col);
                if (IoInt10In() != charAttribute) {
                  IoInt10Out(charAttribute);
                }
              }
              else {
                IoRetraceWrite(displayMemory++,
                charAttribute);
              }
              imageMemory++;
            }
          }
            /* SET RETRACE ON, or installed for
            interrupt 10 or */
            /* old CGA card */
        }
        if (!mouseHidden) {
          MOUSE_SHOW_CURSOR_IF_MOUSE;
        }
        ioImageUpdated = ioUpdateOccurring = FALSE;
    }
}
```

As shown above (and in the figure), the update operation may include additional optimization for writing only that portion of the image which requires updating. For character-based operations, for instance, only those line(s) which have in fact changed need be written. Similarly, for graphical operations, only that portion of the screen bitmap which needs updating (e.g., the "invalid rectangle" familiar to Windows programmers) need be written. Additional mouse cursor processing may be added as desired.

Referring back to FIG. 2B, the interrupt service step 220 concludes (interrupt return), whereby control is returned to the executing process of step 203. Step 205 (although shown conceptually as a loop) simply indicates that other processes of the program are undertaken in a similar fashion (i.e., normal operation with periodic strobes of image memory to video memory). Upon completion of all processes (yes at step 205), the method concludes (and typically returns control to the operating system).

Using the foregoing method, the following comparative screen writing benchmarks have been observed for a PC-based system.

TABLE 2

| Screen write operation | Standard | Optimized |
|---|---|---|
| 1) Window open and close (1000 times) | 16.86 sec | 8.78 sec |
| 2) Clear screen (20,000 times) | 132.27 sec | 15.00 sec |
| 3) Write 50 characters (20,000 times) | 213.72 sec | 46.36 sec |

B. Non-preemptive Embodiment

Figure 3A:
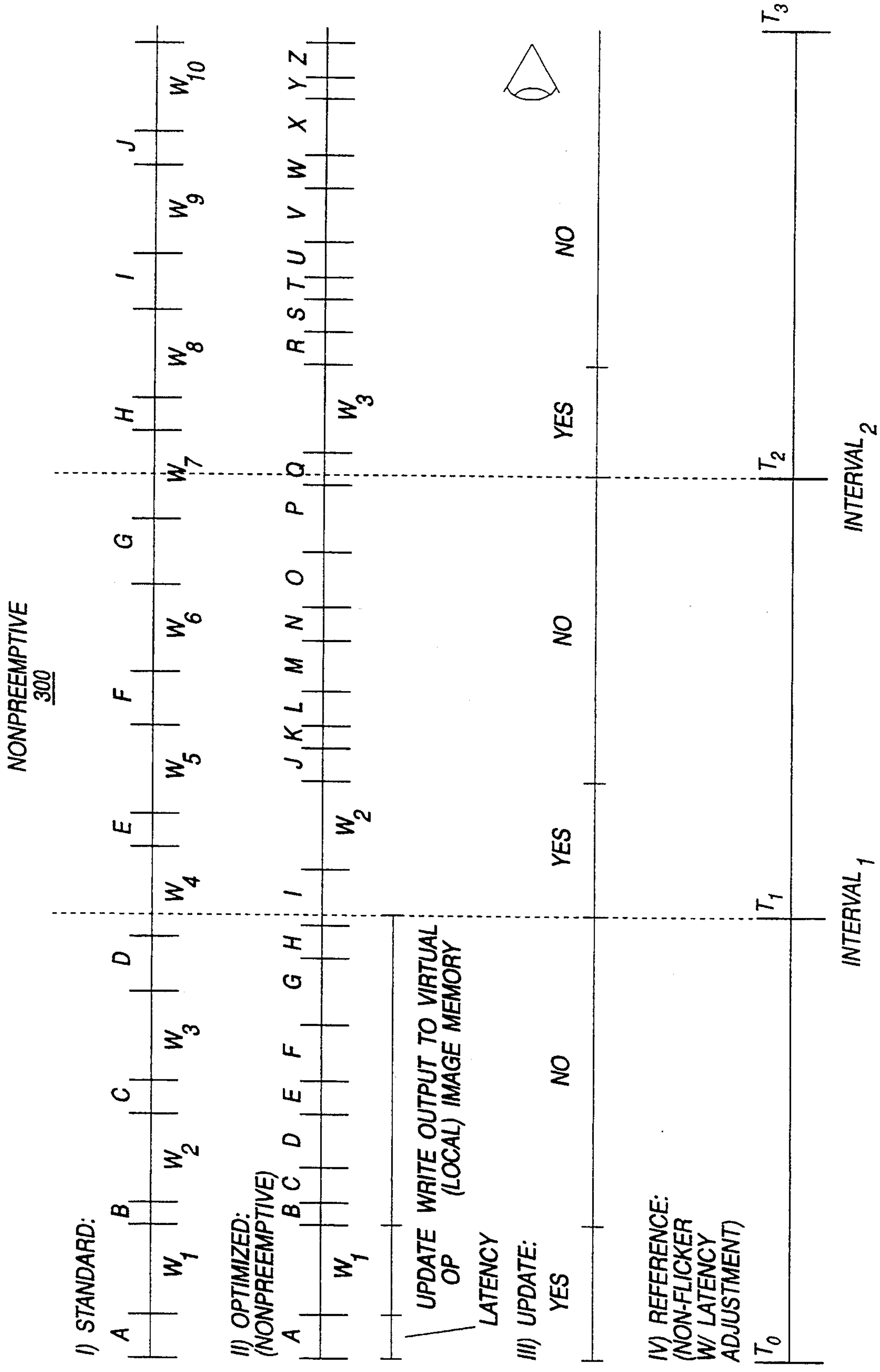
FIG. 3A is a timing diagram illustrating an optimized screen writing method of the present invention, operative in a non-preemptive system.

Referring now to FIG. 3A, an alternative method of the present invention for optimized screen writing will be described. In those systems where a periodic interrupt (or functional equivalent) is not readily available, such as Microsoft Windows 3.0, a non-preemptive method for optimized screen writing may be employed. As is common in those systems, timing intervals are still available; however, they may not be available on a preemptive (interrupt) basis. In Microsoft Windows, for instance, timing messages are queued, thus complicating the design of real-time processes.

According to the present invention, there is no requirement that the screen update operations occur at a precise interval. Instead, one need only achieve an "effective frame rate," that is, a rate which meets or exceeds the visual perception threshold of the user. Thus, the actual time interval between any two screen updates (copy of image memory into video memory) may vary. Ideally, however, one would select a target interval sufficiently small to compensate for any latency between occurrence of an interval (actual) and receipt of a non-preemptive timer message (apparent). In this fashion, a target time interval may be selected to achieve an effective frame rate which meets or exceeds the visual perception threshold of the user.

Figure 3B:
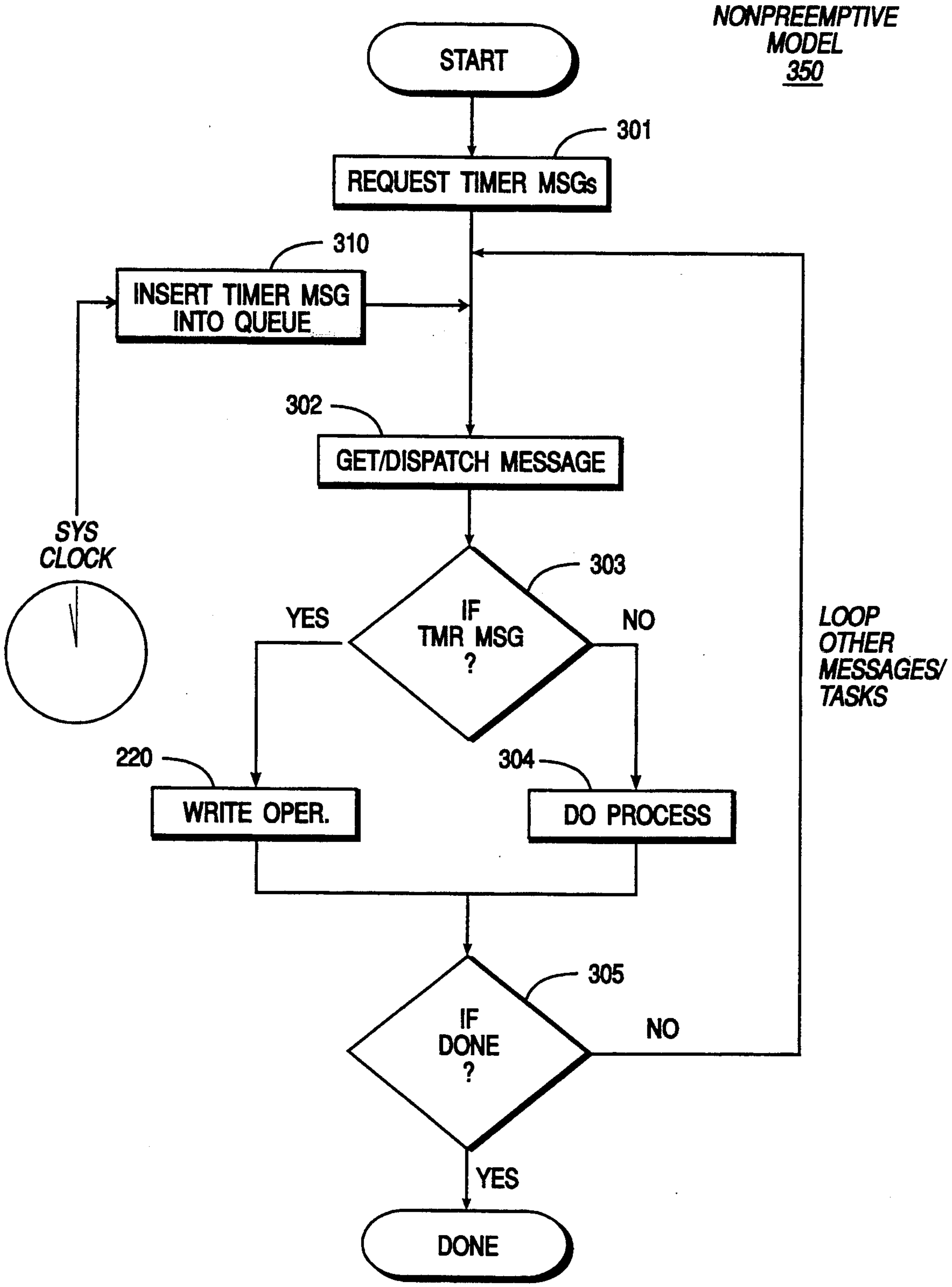
FIG. 3B is a flowchart illustrating a general operation of the optimized screen writing method for non-preemptive systems.

Referring now to FIG. 3B, the method of this alternative embodiment is summarized by a flowchart 350. In step 301, timer messages are requested from the operating system (e.g., Microsoft Windows), with a target interval selected to achieve an effective frame rate meeting or exceeding the user's perception threshold. Next, as illustrated by the flowchart, the message-based, event handling loop of the non-preemptive system is entered. As shown by step 310, appropriate timer messages are placed by the system in the queue of the process, as appropriate. At step 302, any message dispatched to the queue of the process is retrieved and processed. If the specified timer message is retrieved at step 303, the method may undertake the write operation as previously described for step 220. Otherwise (no at step 303), the method does routine event-driven processing, as shown by step 304. As shown conceptually at step 305, the event loop is maintained until a "done" or "quit" message (e.g., Windows' WM_QUIT) is received.

Other techniques for accommodating the non-preemptive nature of Windows-type timers are described in the technical literature. See e.g., Petzold, C., Programming Windows, Second Edition, Microsoft Press, 1990 (Chapter 5: The Timer), the disclosure of which is hereby incorporated by reference.

While the invention is described in some detail with specific reference to a single preferred embodiment and certain alternatives, there is no intent to limit the invention to that particular embodiment or those specific alternatives. For instance, the system 100 may be implemented in other platforms, including Macintosh, Unix, and the like. While the present invention is best implemented in those systems employing computer graphics, those skilled in the art will also appreciate that the present invention may be employed in certain character-based systems, as well. Although the system of the present invention requires no dedicated hardware, the described methods may be implemented with a firmware coupled to the system, if desired; moreover, image memory may be implemented as a dedicated high-speed memory (e.g., SRAM) located physically separate from the system memory. Thus, the true scope of the present invention is not limited to any one of the foregoing exemplary embodiments but is instead defined by the following claims.

What is claimed is:

1. In a system comprising a computer coupled to a display means, the computer including a processor and a main memory, the display means including a display memory and a screen, an improved method for displaying information to a user, the method comprising:

(a) writing the information as an image to a selected region of the main memory; and (b) at a periodic time interval, updating the display memory with the image stored in said selected region of the main memory, whereupon the screen displays the image;

wherein the time interval is selected so that step (b) is performed at a rate (frame rate) lower than a screen refresh rate of the display means, and wherein the frame rate is substantially equal to about 20 to 30 frames/sec.

2. The method of claim 1, further comprising:

(c) repeating steps (a)–(b) for different information, wherein a plurality of different images are stored in the main memory, and wherein only images stored in the main memory at the periodic time interval are displayed to the user.

3. The method of claim 1, wherein the frame rate is substantially equal to about 25 frames.

4. The method of claim 1, wherein the information is stored in the form of a bitmap graphic.

5. The method of claim 4, wherein step (b) includes:

identifying a portion of display memory which requires updating (invalid rectangle); and limiting updating of the display memory with the image stored in said selected region of the main memory to only that portion of display memory which is invalid.

6. The method of claim 1, wherein the information is stored in the form of character-based text information.

7. The method of claim 6, wherein character-based text information comprises a plurality of lines of text information, and wherein step (b) includes:

identifying lines of text in the display memory which requires updating; and limiting updating of the display memory with the image stored in said selected region of the main memory to only those lines of text in the display memory which are invalid.

8. The method of claim 1, wherein in step (b) the display memory is only updated if the information stored in said selected region of the main memory is not identical to information stored in the display memory.

9. The method of claim 1, wherein in step (b) includes the substeps:

setting a system interrupt to occur at a periodic time interval; and upon occurrence of the system interrupt, updating the display memory with the image stored in said selected region of the main memory.

10. The method of claim 1, wherein in step (b) includes the substeps:

setting a system time message to be generated by the system at a periodic time interval (actual time); and upon receipt of the system time message (apparent time), updating the display memory with the image stored in said selected region of the main memory, whereby the periodic time interval is adjusted to compensate for any differences between actual time and apparent time.

11. A data processing system with improved display comprising:

(a) a computer having a processor and a system memory;

(b) means responsive to operations of the processor for providing useful information to a user, said information being stored as a bitmap image in the system memory;

(c) a display means, coupled to the computer, for displaying the information to a user; and (d) means for updating the display means with the information at a time interval such that the information is displayed at a rate substantially equal to about 20 to 30 frames/sec, said rate being lower than a refresh rate of the display means.

12. The system of claim 11, wherein said processor is an Intel ® 80x86 class microprocessor and wherein said means for updating includes a real-time clock (RTC) which generates preemptive interrupts.

13. The system of claim 12, wherein said means for updating includes means responsive to interrupts from the RTC for transferring the bitmap image from the system memory to the display means.

14. The system of claim 11, wherein said system memory and processor operates at an identical clock frequency.

15. The system of claim 11, wherein said processor reads and writes information to the system memory at a word length at least as wide as a general purpose register of the processor.

16. The system of claim 15, wherein said word length is equal to 32-bits.

17. The system of claim 11, wherein the display means comprises:

a screen device for displaying information as a raster image; and graphics controller having a video memory for storing the raster image, whereby the screen device is refreshed from periodic scans of the video memory.

18. The system of claim 17, wherein the screen device is a selected one of a CRT, LCD, and LED display monitor.

19. The system of claim 11, wherein the time interval is selected from a range of 30 msec to 50 msec.

20. The system of claim 11, wherein the time interval substantially equals about 40 msec.

21. In a computer system having a system memory and a display memory, said display memory having slower access than said system memory, an improved method for writing images to the display memory, the improvement comprising:

writing all display information to the system memory, whereby a virtual image is maintained in the system memory; and copying the virtual image to the display memory for display to a user;

storing a flag for indicating concurrency between the image stored in the system memory and the image stored in the display memory, whereby the flag is set when display information is written to the system memory and reset when the virtual image is copied to the display memory; and only copying the virtual image to the display memory when the flag is set ("dirty" image).

22. The method of claim 21, wherein the information comprises character-based (text) information.

23. The method of claim 22, further comprising:

identifying a portion of the character-based information (lines of text) which needs updating; and copying only that portion from the virtual image to the display memory.

24. The method of claim 21, wherein the information comprises graphics (bitmap) information.

25. The method of claim 24, further comprising:

identifying a portion of the graphics (bitmap) information which needs updating; and copying only that portion from the virtual image to the display memory.

26. The method of claim 21, wherein said copying step comprising copying said virtual image from said system memory to said display memory at a rate selected from a range of about 20 to 30 images per second.

27. The method of claim 21, wherein said rate is set equal to about 25 images per second.

* * * * *